United States Patent [19]
Narisawa

[11] Patent Number: 6,067,182
[45] Date of Patent: May 23, 2000

[54] OPTICAL SCANNING DEVICE

[75] Inventor: Hidetsugu Narisawa, Kanagawa, Japan

[73] Assignee: Fuji Xerox Co., Ltd., Tokyo, Japan

[21] Appl. No.: 09/223,770

[22] Filed: Dec. 31, 1998

[30]     Foreign Application Priority Data

Jan. 5, 1998  [JP]  Japan .................................. 10-000191

[51] Int. Cl.⁷ .................................................. G02B 26/08
[52] U.S. Cl. .......................... 359/204; 359/205; 359/216; 359/217
[58] Field of Search .................................... 359/204–207, 359/216–219; 347/243, 241, 247, 233, 244

[56]            References Cited

U.S. PATENT DOCUMENTS 5,270,851  12/1993  Makino et al. ........................ 359/216

FOREIGN PATENT DOCUMENTS 1-52728  11/1989  Japan .
2138162  10/1984  United Kingdom ........... G02B 27/17

*Primary Examiner*—Cassandra Spyrou
*Assistant Examiner*—Fayez Assai
*Attorney, Agent, or Firm*—Finnegan, Henderson, Farabow, Garrett & Dunner, L.L.P.

[57]            ABSTRACT

An optical scanning device for scanning over a scanned surface in a main scanning direction with a plurality of light beam at the same time, which comprises a light source section having a plurality of light emitting sources that can be driven separately, a deflector for deflecting the plural light beams emitted from the light emitting sources, and an image formation optical system for focusing the light beams on the scanned face, the image formation optical system having an image formation magnification along the main scanning direction which is equal to or less than an image formation magnification along a sub scanning direction perpendicular to the main scanning direction.

15 Claims, 16 Drawing Sheets

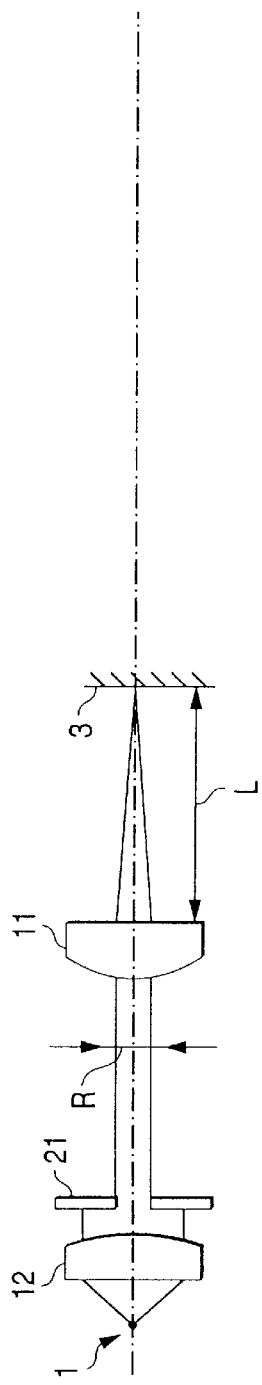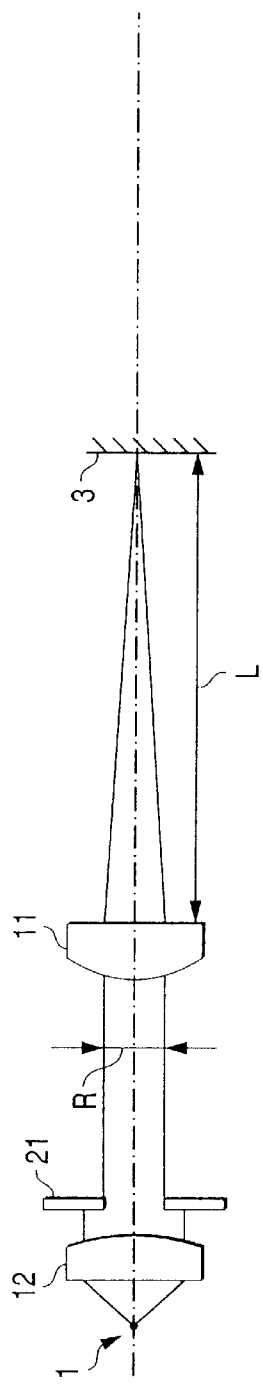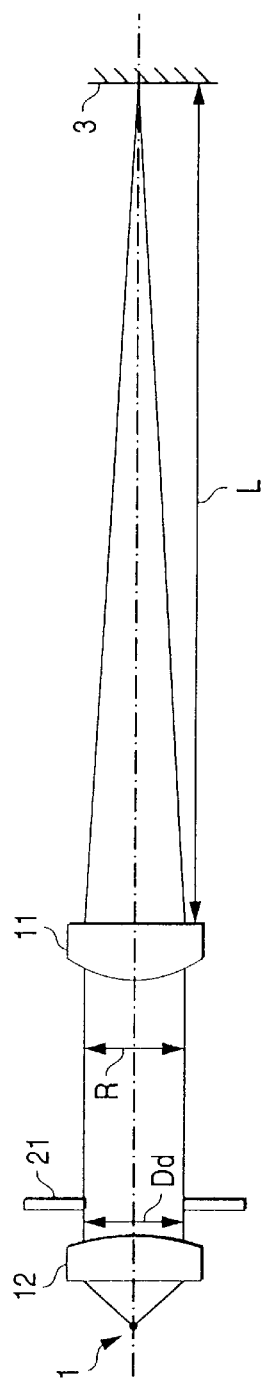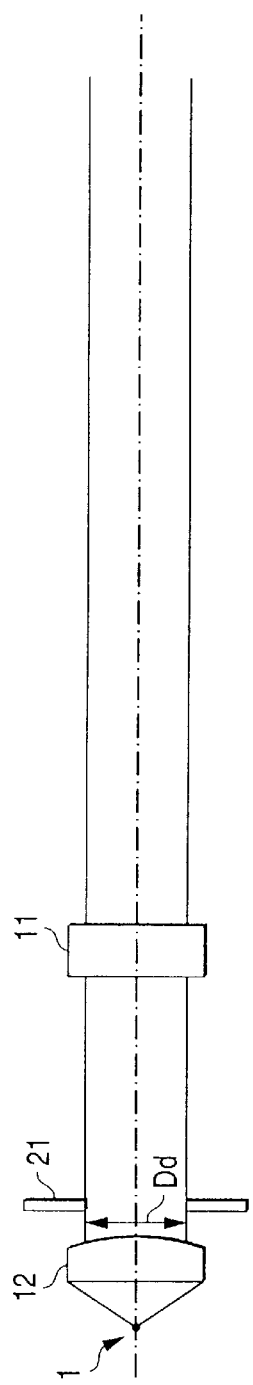
FIG. 7A
FIG. 7B
FIG. 7C
FIG. 7D

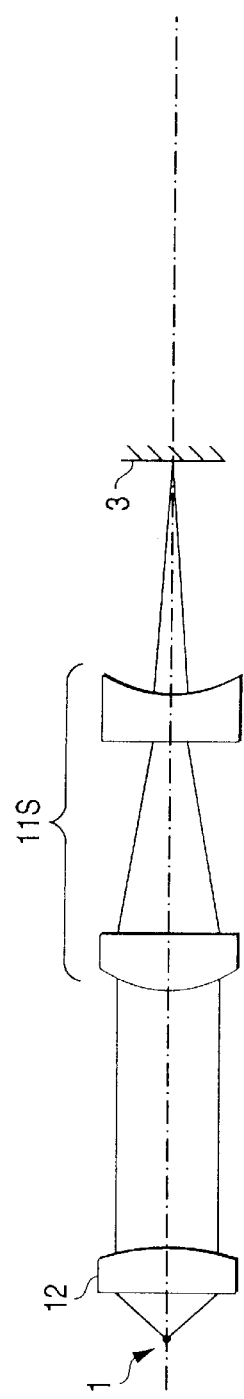
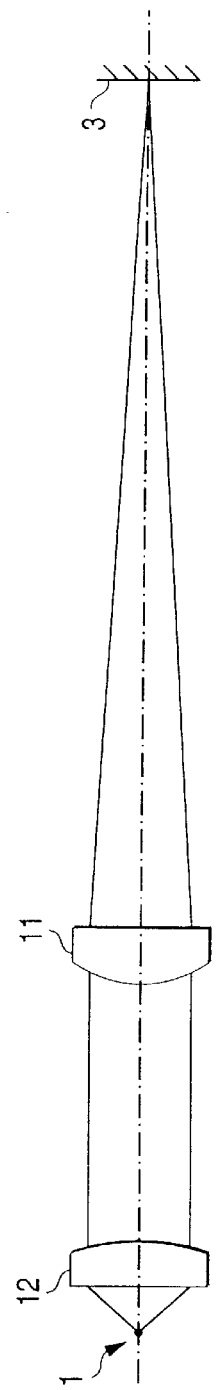
FIG. 9A
FIG. 9B

FIG. 11

| OPTICAL SYSTEM | βT | βS | INTERLACED LENS |
|---|---|---|---|
| OVERFILLED + DOUBLE-PASS SCAN LENS | 7.5 | 9.0 | 3 |
| OVERFILLED | 12.6 | 15.0 | 5 |
| UNDERFILLED | 19.3 | 21.0 | 7 |

FIG. 12

| OPTICAL SYSTEM | WAY OF SCANNING | ESSENTIAL BEAM DIAMETER IN SUB SCANNING DIRECTION | ENERGY EFFICIENCY (%) | RATIO |
|---|---|---|---|---|
| OVERFILLED + SCAN LENS DOUBLE PASS | ADJACENT | 0.7 | 2.94 | 1 |
| (DITTO) | 3-LINES SPACE | 2.1 | 8.61 | 2.93 |
| (DITTO) | 5-LINES SPACE | 3.5 | 11.86 | 4.03 |
| UNDERFILLED | ADJACENT | 0.7 | 5.58 | 1 |
| (DITTO) | 3-LINES SPACE | 2.1 | 16.61 | 2.98 |
| (DITTO) | 5-LINES SPACE | 3.5 | 26.14 | 4.68 |
| (DITTO) | 7-LINES SPACE | 4.9 | 32.75 | 5.87 |

FIG. 13

| REFERENCE NUMERAL IN FIG. 1 | | CURVATURE RADIUS | SPACING OR LENS THICKNESS | MATERIAL | REMARKS |
|---|---|---|---|---|---|
| 1 | | 0 | 10.116 | | |
| 12 | FRONT | INFINITY | 4 | SF8 | |
| 12 | REAR | -8.43476 | 7 | | ASPHERE |
| 11 | FRONT | 31.006 | 5.75 | BK7 | |
| 11 | REAR | INFINITY | 31 | | |
| 4A | | INFINITY | 27.184 | | REFL |
| 3 | | INFINITY | -24.985 | | REFL |
| 15 | FRONT | -230.85 | 14 | F2 | |
| 15 | REAR | INFINITY | 22 | | |
| 15 | FRONT | INFINITY | 16 | SF10 | |
| 15 | REAR | -123.22 | 80.824 | | |
| 4B | | INFINITY | -36.41 | | REFL |
| 5 | | 198.5 | 10 | | REFL |
| 6 | FRONT | INFINITY | 1.35 | BK7 | |
| 6 | REAR | INFINITY | 163.65 | | |
| 19 | | INFINITY | | | PR |
| | | | | | |

FIG. 14

| REFERENCE NUMERAL IN FIG. 4 | | CURVATURE RADIUS | SPACING OR LENS THICKNESS | MATERIAL | REMARKS |
|---|---|---|---|---|---|
| 1 | | 0 | 10.463 | | |
| 12 | FRONT | 105.3 | 2.5 | SK5 | |
| 12 | REAR | -7.75398 | 71.3 | | ASPHERE |
| 11 | FRONT | 60.47 | 1.4 | PMMA | |
| 11 | REAR | INFINITY | 143 | | |
| 4A | | INFINITY | 60 | | REFL |
| 7 | FRONT | INFINITY | -3 | BK7 | |
| 7 | REAR | 226.68 | -48 | | |
| 3 | | INFINITY | 31 | | REFL |
| 15 | FRONT | -162.59 | 8 | F2 | |
| 15 | REAR | INFINITY | 21.034 | | |
| 15 | FRONT | INFINITY | 11 | SF10 | |
| 15 | REAR | -110.38 | 23 | | |
| 4B | | INFINITY | -205.3 | | REFL |
| 5 | | 163.95 | 90.8 | | |
| 19 | | INFINITY | | | PR |
| | | | | | |

FIG. 15

| REFERENCE NUMERAL IN FIG. 5 | | CURVATURE RADIUS | SPACING OR LENS THICKNESS | MATERIAL | REMARKS |
|---|---|---|---|---|---|
| 1 | | INFINITY | 11.14 | | |
| 12 | FRONT | 105.3 | 2.5 | SK5 | |
| 12 | REAR | -7.75398 | 71.3 | | ASPHERE |
| 8 | FRONT | -46.3 | 3 | BK7 | |
| 8 | REAR | INFINITY | 60.4 | | REFL |
| 4A | | INFINITY | -57.654 | | |
| 11 | FRONT | -55.54195 | -5 | BK7 | |
| 11 | REAR | INFINITY | -22.346 | | |
| 4A | | INFINITY | 140 | | REFL |
| 15 | FRONT | 122.67 | 10 | SF10 | |
| 15 | REAR | INFINITY | 26 | | |
| 15 | FRONT | INFINITY | 9 | F2 | |
| 15 | REAR | 170.43 | 18.5 | | |
| 3 | | INFINITY | | | REFL |
| 15 | FRONT | 170.43 | -9 | F2 | |
| 15 | REAR | INFINITY | -26 | | |
| 15 | FRONT | INFINITY | -10 | SF10 | |
| 15 | REAR | 122.67 | -115 | | |
| 4B | | INFINITY | | | REFL |
| 5 | | -185.2 | -40.28 | | REFL |
| 6 | FRONT | INFINITY | -1.35 | | |
| 6 | REAR | INFINITY | -80 | | |
| 19 | | INFINITY | | | PR |
| | | | | | |

FIG. 16

| REFERENCE NUMERAL IN FIG. 6 | | CURVATURE RADIUS | SPACING OR LENS THICKNESS | MATERIAL | REMARKS |
|---|---|---|---|---|---|
| 1 | | INFINITY | 11.14 | | |
| 12 | FRONT | 105.3 | 2.5 | SK5 | |
| 12 | REAR | -7.75398 | 71.3 | | ASPHERE |
| 8 | FRONT | -46.3 | 3 | BK7 | |
| 8 | REAR | INFINITY | 10.4 | | REFL |
| 4A | | INFINITY | -0.654 | | |
| 11 | FRONT | -55.54195 | -5 | BK7 | |
| 11 | REAR | INFINITY | -128.346 | | |
| 4A | | INFINITY | 140 | | REFL |
| 15 | FRONT | 122.67 | 10 | SF10 | |
| 15 | REAR | INFINITY | 26 | | |
| 15 | FRONT | INFINITY | 9 | F2 | |
| 15 | REAR | 170.43 | 18.5 | | |
| 3 | | INFINITY | | | REFL |
| 15 | FRONT | 170.43 | -9 | F2 | |
| 15 | REAR | INFINITY | -26 | | |
| 15 | FRONT | INFINITY | -10 | SF10 | |
| 15 | REAR | 122.67 | -115 | | |
| 4B | | INFINITY | | | REFL |
| 5 | | -185.2 | -40.28 | | REFL |
| 6 | FRONT | INFINITY | -1.35 | | |
| 6 | REAR | INFINITY | -80 | | |
| 19 | | INFINITY | | | PR |
| | | | | | |

OPTICAL SCANNING DEVICE

BACKGROUND OF THE INVENTION

The present invention relates to an optical scanning device and more particularly to an optical scanning device for scanning beams from a plurality of light emitting sources over a scanned face.

Hitherto, an image formation system such as a laser beam printer for irradiating a rotating polygon mirror with a laser beam from a single light source and applying the reflected beam from the rotating polygon mirror to the charged surface of a photosensitive body moving at constant speed has been known. In such an image formation system, the laser beam from the light source is modulated in response to the digital image data of the image to be output and as the rotating polygon mirror rotates, the laser beam is scanned in the direction perpendicular to the move direction of the photosensitive body surface, thus an electrostatic latent image is formed on the photosensitive body and is developed to a visible toner image.

To provide an output image of high quality at high speed by the image formation system, it becomes necessary to scan a high-speed and high power laser beam.

However, there are limitations of the number of revolutions of the rotating polygon mirror and the luminous energy of the laser beam emitted from a single light source. To solve this problem, Examined Japanese Patent Publication No. Hei 1-52728 proposed a related art for using a laser diode array (MSLD: Multispot laser diode) comprising a number of light emitting sources as a light source and scanning a high power laser beam. In this art, MSLD is used for speeding up and the focal length of a collimator lens is made short as much as possible and the laser beam from the MSLD is taken as scan beam as much as possible for providing high power output. In other words, image formation magnification $\beta T$ along the main scanning direction is made great.

That is, as shown in FIG. 10, an image formation system 90 is designed so that light sources 92A and 92B and a collimator lens 94 are brought close to each other. Letting the focal length of a scan lens 96 be f and the focal length of the collimator lens 94 be $f_c$, image formation magnification $\beta T = f/f_c$, thus the smaller the focal length $f_c$, the greater the image formation magnification $\beta T$.

However, if the MSLD and the collimator lens are brought close to each other in placement as described above, when the spacing between the MSLD and the collimator lens changes due to temperature change, vibration, etc., an defocus or dealignment phenomenon easily occurs on a photosensitive body and it is feared that the quality of the formed image may be degraded.

Generally, the beam diameter in the scanning direction is made smaller than that in the sub scanning direction to provide a high-quality image, thus the focus depth in the scanning direction is smaller than that in the sub scanning direction; the defocus phenomenon easily occurs.

SUMMARY OF THE INVENTION

It is therefore an object of the present invention to provide an optical scanning device that can lessen an defocus or dealignment phenomenon on a scanned face if the spacing between a light source and a collimator lens changes due to temperature change, vibration, etc., while intending high power output of scan beam.

In order to achieve the above object, there is provided an optical scanning device for scanning over a scanned surface in a main scanning direction with a plurality of light beam at the same time, the optical scanning device comprising: a light source section having a plurality of light emitting sources that can be driven separately; a deflector for deflecting the plural light beams emitted from the light emitting sources; and an image formation optical system for focusing the light beams on the scanned face, the image formation optical system having an image formation magnification along the main scanning direction which is equal to or less than an image formation magnification along a sub scanning direction perpendicular to the main scanning direction.

The optical scanning device according to the present invention comprises the light source section having a plurality of light emitting sources that can be driven separately. The plurality of light beams emitted from the light emitting sources are deflected by the deflector and are focused on the scanned face by the image formation optical system. The optical scanning device thus scans the light beams over the scanned face in the main scanning direction at the same time.

In the optical scanning device, the image formation magnification of the image formation optical system along the main scanning direction, which will be hereinafter referred to as image formation magnification $\beta T$, is set equal to or less than the image formation magnification of the image formation optical system along the sub scanning direction perpendicular to the main scanning direction on the scanned face, which will be hereinafter referred to as image formation magnification $\beta S$.

In the image formation optical system of the optical scanning device in the related art, the image formation magnification $\beta T$ is set larger than the image formation magnification $\beta S$, but the following advantages are provided by setting the image formation magnification $\beta T$ equal to or less than the image formation magnification $\beta S$ at least by setting the image formation magnification $\beta T$ small or the image formation magnification $\beta S$ large:

First, the advantage provided by setting the image formation magnification $\beta T$ small is as follows: As previously described, the image formation magnification $\beta T$ is represented by:

$$\beta T = \frac{f}{f_c} \quad (1)$$

wherein, f denotes a focal length of an optical system having power in a main scanning direction, placed between a deflector and a scanned face; and $f_c$ denotes a focal length of the optical system having power in the main scanning direction, placed between a light source section and the deflector.

Thus, setting the image formation magnification $\beta T$ small is equivalent to setting the focal length $f_c$ large relatively to the focal length f, and the spacing between the light source section and the optical system having power in the main scanning direction, placed between the light source section and the deflector widens accordingly.

Therefore, if the spacing between the light source section and the optical system having power in the main scanning direction, placed between the light source section and the deflector changes due to temperature change, vibration, etc., an defocus or dealignment phenomenon on the scanned face can be lessened and the optical scanning performance can be maintained at a high level.

Next, the advantage provided by setting the image formation magnification $\beta S$ large is as follows: The image formation magnification βS is made large, whereby wider light beams than was previously possible along the sub scanning direction, of the light beams emitted from the light source section are taken as scan beam, thus the transmittance of the light beams can be improved than was previously possible and high power output of scan beam can be intended.

Thus, an defocus or dealignment phenomenon on the scanned face can be lessened by setting the image formation magnification βT small, and high power output of scan beam can be intended by setting the image formation magnification βS large.

To actually set the image formation magnification βT small or the image formation magnification βS large, there is a limitation on the configuration of the optical scanning device. Thus, to set the image formation magnification βT equal to or less than the image formation magnification βS, it is necessary to make the image formation magnification βT small and the image formation magnification βS large. Therefore, according to the present invention, while high power output of scan beam can be intended, if the spacing between the light source section and the optical system having power in the main scanning direction, placed between the light source section and the deflector changes due to temperature change, vibration, etc., an defocus or dealignment phenomenon on the scanned face can be lessened and the optical scanning performance can be maintained at a high level.

If the optical scanning device according to the present invention executes interlaced scanning with a plurality of scan beams, higher output of scan beam can be intended as follows:

As listed in a table of FIG. 12, for example, in the configuration of an underfilled optical system, the beam width required along the sub scanning direction in an interlaced scanning mode with a three-lines space becomes three times that in an adjacent scanning mode and the beam width required along the sub scanning direction in an interlaced scanning mode with a five-lines space becomes five times that in the adjacent scanning mode.

The interlaced scanning with a three-lines space means to execute interlaced scanning so that scan lines are scanned with a three-lines space at a time (in which a two-line space is skipped), in which case the number of interlaced lines is three. Likewise, the interlaced scanning with a five-lines space means to execute interlaced scanning so that scan lines are scanned with a five-lines space at a time (in which a four-line space is skipped), in which case the number of interlaced lines is five.

To execute interlaced scanning, wider light beams along the sub scanning direction than those in adjacent scanning are taken from light beams and are scanned, so that higher output of scan beam can be intended.

Specifically, as listed in the table of FIG. 12, in the configuration of the underfilled optical system, while the energy efficiency in the adjacent scanning mode is 5.58%, that in the interlaced scanning mode with a three-lines space is 16.61%, namely, the latter becomes 2.98 times the former; that in the interlaced scanning mode with a five-lines space is 26.14%, namely, becomes 4.68 times the energy efficiency in the adjacent scanning mode.

It is also effective that a lens for reducing or enlarging the beam width along the main scanning direction is placed between the light source section and the deflector to make small the image formation magnification βT according to the present invention. In this case, the focal length $f_c$ along the main scanning direction in the optical system between the light source section and the deflector in the above-mentioned equation (1) becomes the composite focal length of the lens and the optical system having power in the main scanning direction, placed between the light source section and the deflector (for example, collimator lens) and the value becomes large, thus the image formation magnification βT becomes smaller and an defocus or dealignment phenomenon on the scanned face can be lessened.

If the overfilled optical system is adopted as the image formation optical system, the deflector (for example, rotating polygon mirror) can be downsized and vibration of the drive mechanism of a motor, etc., occurring with the rotation operation of the deflector can be decreased.

To thus adopt the overfilled optical system as the image formation optical system, preferably scan lens for moving the light beams deflected by the deflector on the scanned face at substantially constant speed (for example, fθ lens) are placed so as to allow not only the deflected light beam, but also the light beam incident on the deflector to pass through. Such placement of the scan lens is known as effective placement when the overfilled optical system is adopted. According to the placement, the incidence angle of the light beam incident on the deflector can be made small and degradation of the light quantity distribution on the scanned face along the main scanning direction can be lessened.

By the way, when the optical scanning device comprising the collimator lens being placed in the proximity of the light source section for making the light beams a substantially collimated light flux executes interlaced scanning with a plurality of light beams as described above, preferably the beam width along the sub scanning direction, of the light beam just after the light beam is emitted from the collimator lens is equal to or greater than the beam width along the main scanning direction.

For example, light emitting elements configured so that the spread angle of the emitted light along the sub scanning direction becomes equal to or greater than that along the main scanning direction may be adopted as light emitting sources.

Generally, the beam width along the sub scanning direction, of the light beam just after the light beam is emitted from the collimator lens is smaller than the beam width along the main scanning direction. However, the optical scanning device is configured as described above, whereby light beam of a wide beam width in the sub scanning direction required for executing interlaced scanning can be provided and interlaced scanning can be executed smoothly.

In the optical scanning device comprising the collimator lens placed in the proximity of the light source section, for truncation as attenuation factor relative to the entrance pupil of the collimator lens, preferably the following expression (2) is true:

$$2X(1-T_1) \leq 1-T_2 \leq NX(1-T_1) \tag{2}$$

where truncation in the sub scanning direction in an adjacent scanning mode is $T_1$, truncation in the sub scanning direction in an interlaced scanning mode is $T_2$, and the maximum number of interlaced lines enabling interlaced scanning in the range of the effective diameter of the collimator lens is N.

In this case, as described later, interlaced scanning can be executed with any number of interlaced lines between the minimum number of interlaces lines and the maximum number of interlaced lines enabling interlaced scanning in the range of the effective diameter of the collimator lens as the beam diameter along the sub scanning direction on the scanned face remains constant in every number of beams, and high power output of scan beam can be intended as described above.

The expression (2) will be discussed. The description uses a general case where a cylindrical lens 11 as the optical system having power in the sub scanning direction is placed between a light source section 1 and a deflector 3, as illustrated in FIGS. 8A, 8B, and 8C.

As seen in FIGS. 8A, 8B, and 8C, if interlaced scanning is executed as the beam diameter along the sub scanning direction on the scanned face remains constant, the beam width just before incidence on the cylindrical lens 11 needs to be enlarged.

For example, if two beams are emitted from the light source section 1, the minimum number of interlaced lines is three and the maximum number of interlaced lines is determined by the effective diameter of the collimator lens 12 and the width of the slit 21 along the sub scanning direction in the adjacent scanning mode.

This is grasped as attenuation factor (truncation) relative to the entrance pupil of the collimator lens 12. The truncation mentioned here is represented by the following expression (3):

$$T = 1 - \frac{D}{d} \quad (3)$$

wherein, T denotes the truncation; D denotes a beam diameter in sub scanning direction before cylindrical lens; and d denotes diameter of entrance pupil of collimator lens.

Thus, the following expression (4) is obtained:

$$D = d(1-T) \quad (4)$$

For beam diameter $D_a$ in the sub scanning direction before the cylindrical lens 11 in the adjacent scanning mode shown in FIG. 8A, the following expression (5) is obtained from expression (4):

$$D_a = d(1-T_1) \quad (5)$$

On the other hand, for beam diameter $D_b$ in the sub scanning direction before the cylindrical lens 11 in the interlaced scanning mode shown in FIG. 8B, the following expression (6) is obtained from expression (6):

$$D_b = d(1-T_2) \quad (6)$$

FIG. 8C shows scanning on the maximum number of interlaced lines enabling interlaced scanning in the range of the effective diameter of the collimator lens 12. Expression (6) is also applied to beam diameter $D_c$, in the sub scanning direction before the cylindrical lens 11 at the time.

If the following expression (7) holds for the beam diameters $D_a, D_b,$ and $D_c$, interlaced scanning can be executed with any number of interlaced lines between the minimum number of interlaces lines and the maximum number of interlaced lines enabling interlaced scanning in the range of the effective diameter of the collimator lens:

$$3D_b \leq D_a \leq ND_c \quad (7)$$

By the way, when three light beams are emitted from the light source section, the minimum number of interlaces lines becomes two. Thus, if the following expression (8) holds, interlaced scanning can be executed with any number of interlaced lines between the minimum number of interlaced lines and the maximum number of interlaced lines enabling interlaced scanning in the range of the effective diameter of the collimator lens with every number of beams:

$$2D_b \leq D_a \leq ND_c \quad (8)$$

The expression (2) is derived by assigning the expressions (5) and (6) to the expression (8):

$$2X(1-T_1) \leq 1-T_2 \leq NX(1-T_1) \quad (2)$$

Thus, if the optical scanning device is configured so that the expression (2) equivalent to the expression (8) holds, interlaced scanning can be executed with any number of interlaced lines between the minimum number of interlaced lines and the maximum number of interlaced lines enabling interlaced scanning in the range of the effective diameter of the collimator lens as the beam diameter along the sub scanning direction on the scanned face remains constant in every number of beams.

By the way, generally, the image formation optical system is provided with an optical system being placed between the light source section and the deflector for converging the light beams from the light source section on the deflection face of the deflector along the sub scanning direction, as shown in FIG. 9B.

As described above, to execute interlaced scanning, wider light beams in the sub scanning direction than those in adjacent scanning are taken from the light beams from the light source section and are scanned, thus it becomes necessary to set a long focal length of the optical system for converging the light beams on the deflection face and a long light path length between the light source section and the deflector.

Then, if the optical system for converging the light beams on the deflection face comprises a cylindrical lens having at least one side shaped like a convexity and a cylindrical lens having at least one side shaped like a concavity, as shown in FIG. 9A, the light path length between the light source section and the deflector can be shortened and the optical scanning device can be miniaturized as compared with the configuration in FIG. 9B.

BRIEF DESCRIPTION OF THE DRAWINGS

In the accompanying drawings:

FIGS. 7A to 7D are illustrations to describe a pre-polygon optical system according to a fifth embodiment of the present invention; FIG. 7A is a sectional view along the sub scanning direction of the pre-polygon optical system for executing adjacent scanning; FIG. 7B is a sectional view along the sub scanning direction of the pre-polygon optical system for executing interlaced scanning with a three-lines space; FIG. 7C is a sectional view along the sub scanning direction of the pre-polygon optical system for executing interlaced scanning with a five-lines space; and FIG. 7D is a sectional view along the main scanning direction of the pre-polygon optical system in FIGS. 7A to 7C;

FIG. 8A is a sectional view along the sub scanning direction of the pre-polygon optical system for executing adjacent scanning; FIG. 8B is a sectional view along the sub scanning direction of the pre-polygon optical system for executing interlaced scanning with a three-lines space; FIG. 8C is a sectional view along the sub scanning direction of the pre-polygon optical system for executing interlaced scanning with a 11-line space; and FIG. 8D is a sectional view along the main scanning direction of the pre-polygon optical system in FIGS. 8A to 8C;

FIG. 9A is a diagram showing a placement of cylindrical lenses comprising a convex lens and a concave lens in combination;

FIG. 9B is a diagram showing a placement of a single cylindrical lens;

FIG. 11 is a table listing examples of $\beta T$, $\beta S$, etc., in different optical systems;

FIG. 12 is a table listing the beam widths in the sub scanning direction required in adjacent scanning mode and interlaced scanning modes, energy efficiency, etc.;

FIG. 13 is a table listing the specifications of an optical system placed in the optical scanning device of FIG. 1;

FIG. 14 is a table listing the specifications of an optical system placed in the optical scanning device of FIG. 4;

FIG. 15 is a table listing the specifications of an optical system placed in the optical scanning device of FIG. 5; and FIG. 16 is a table listing the specifications of an optical system placed in the optical scanning device of FIG. 6.

DETAILED DESCRIPTION OF THE PREFERRED EMBODIMENTS

Figure 1:
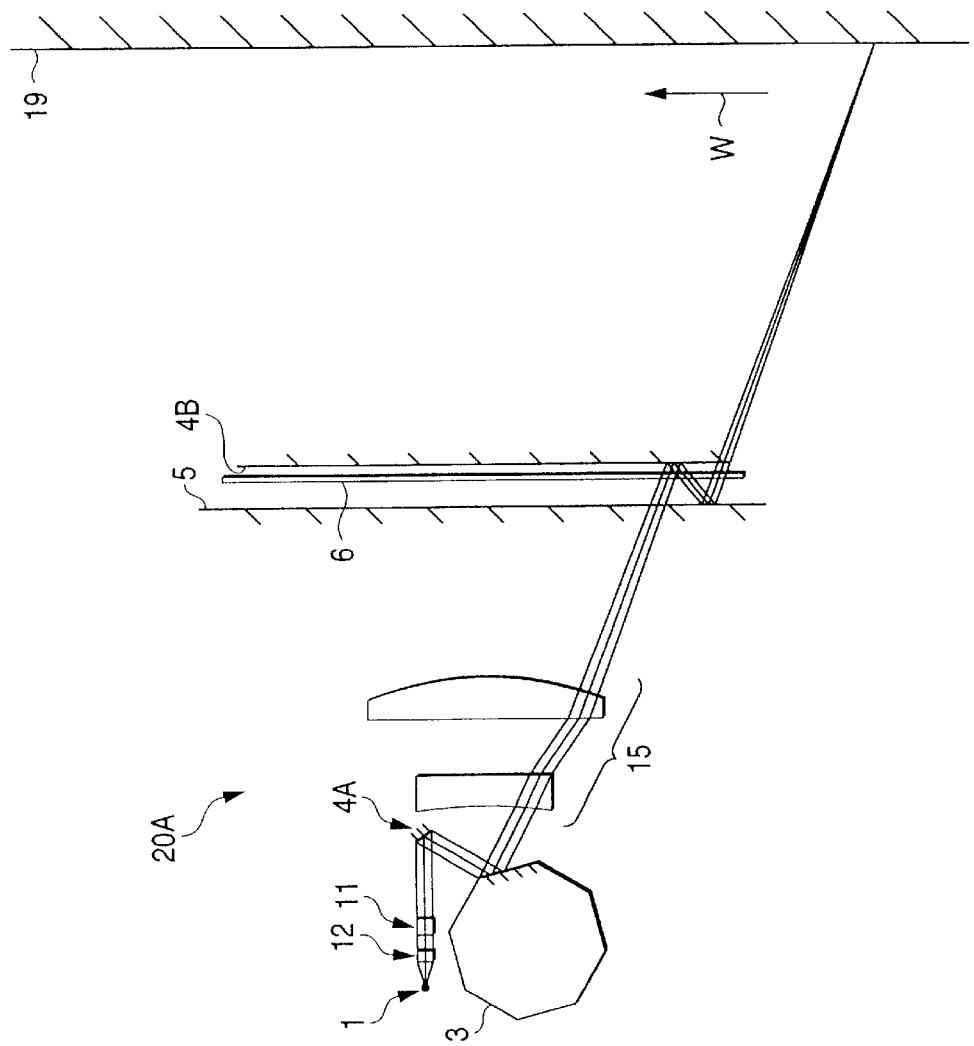
FIG. 1 is a schematic diagram to show the configuration of an optical scanning device according to a first embodiment of the present invention.

Referring now to the accompanying drawings, there are shown preferred embodiments of the present invention.

A first embodiment of the present invention corresponding to the present invention will be discussed.

First, the configuration of an optical scanning device 20A according to the present invention will be discussed with reference to FIG. 1. As shown here, the optical scanning device 20A is provided with a light source 1 made up of a plurality of light emitting sources that can be driven separately, and a collimator lens 12, a cylindrical lens 11 having power only in the sub scanning direction described later, a mirror 4A, and a rotating polygon mirror 3 are placed in order from the near side to the light source 1 to the far side on a light path of light beams emitted from the light source 1. The rotating polygon mirror 3 is formed on side face with a number of reflection faces and is rotated at equi-angular speed in a predetermined direction by a drive force of a scanner motor (not shown) for deflecting light beams.

Scan lenses 15, a mirror 4B, and a cylinder mirror 5 having power only in the sub scanning direction described later are placed in order from the near side to the rotating polygon mirror 3 to the far side on a light path of the deflected light beams. The light beams reflected on the cylinder mirror 5 pass through a dust-proof cover glass 6, then are applied to a scanned face 19.

Since the light beams incident on the rotating polygon mirror 3 are deflected on the side face of the rotating polygon mirror 3 rotating in the predetermined direction, the deflection angle changes continuously and the light beams are scanned over the scanned face 19. The light beams from a number of light emitting sources of the light source 1 are thus scanned over the scanned face 19 at the same time.

The direction in which the deflected light beams are scanned over the scanned face 19 (arrow W direction in FIG. 1) is referred to as the main scanning direction and the direction orthogonal to the main scanning direction on the scanned face 19 (perpendicular direction to the paper plane in FIG. 1) is referred to as the sub scanning direction. The optical system between the light source 1 and the rotating polygon mirror 3 is called a pre-polygon optical system and the optical system between the rotating polygon mirror 3 and the scanned face 19 is called a post-polygon optical system. The pre-polygon optical system and the post-polygon optical system are collectively called an optical system.

The light source 1 is formed of a laser diode array (MSLD: Multispot Laser Diode) comprising a number of light emitting sources arranged along the sub scanning direction.

In the optical scanning device 20A of the embodiment as described above, while image formation magnification $\beta T$ of the optical system along the main scanning direction is made small, image formation magnification $\beta S$ of the optical system along the sub scanning direction is made large, whereby the image formation magnification $\beta T$ is set to less than the image formation magnification $\beta S$.

The image formation magnification $\beta T$ is thus made small, whereby the spacing between the light source 1 and the collimator lens 12 can be widened. Thus, if the spacing between the light source 1 and the collimator lens 12 changes due to temperature change, vibration, etc., an defocus or dealignment phenomenon on the scanned face 19 can be lessened and the optical scanning performance can be maintained at a high level.

The image formation magnification $\beta S$ is made large, whereby wider light beams than was previously possible along the sub scanning direction, of the light beams emitted from the light source 1 are taken as scan beam, thus the transmittance of the light beams can be improved and high power output of scan beam can be intended.

That is, according to the first embodiment, while high power output of scan beam is intended, an defocus or dealignment phenomenon on the scanned face 19 can be lessened if the spacing between the light source 1 and the collimator lens 12 changes due to temperature change, vibration, etc.

The specifications of the optical system (optical system in adjacent scanning) of the optical scanning device 20A of general underfilled type shown in FIG. 1 are listed in a table of FIG. 13 in relation to the reference numerals in FIG. 1. As common items to FIG. 13–FIG. 16, the reflection angles of the mirrors 4A and 4B are not particularly important in the art, thus the reflection angle in the main scanning direction and that in the sub scanning direction are omitted. "REFL" under REMARKS denotes reflection of the mirror and "INFINITY" under CURVATURE RADIUS means infinity.

Next, a second embodiment of the present invention will be discussed. In the second embodiment, interlaced scanning is performed with light beams from a number of light emitting sources.

Figure 2:
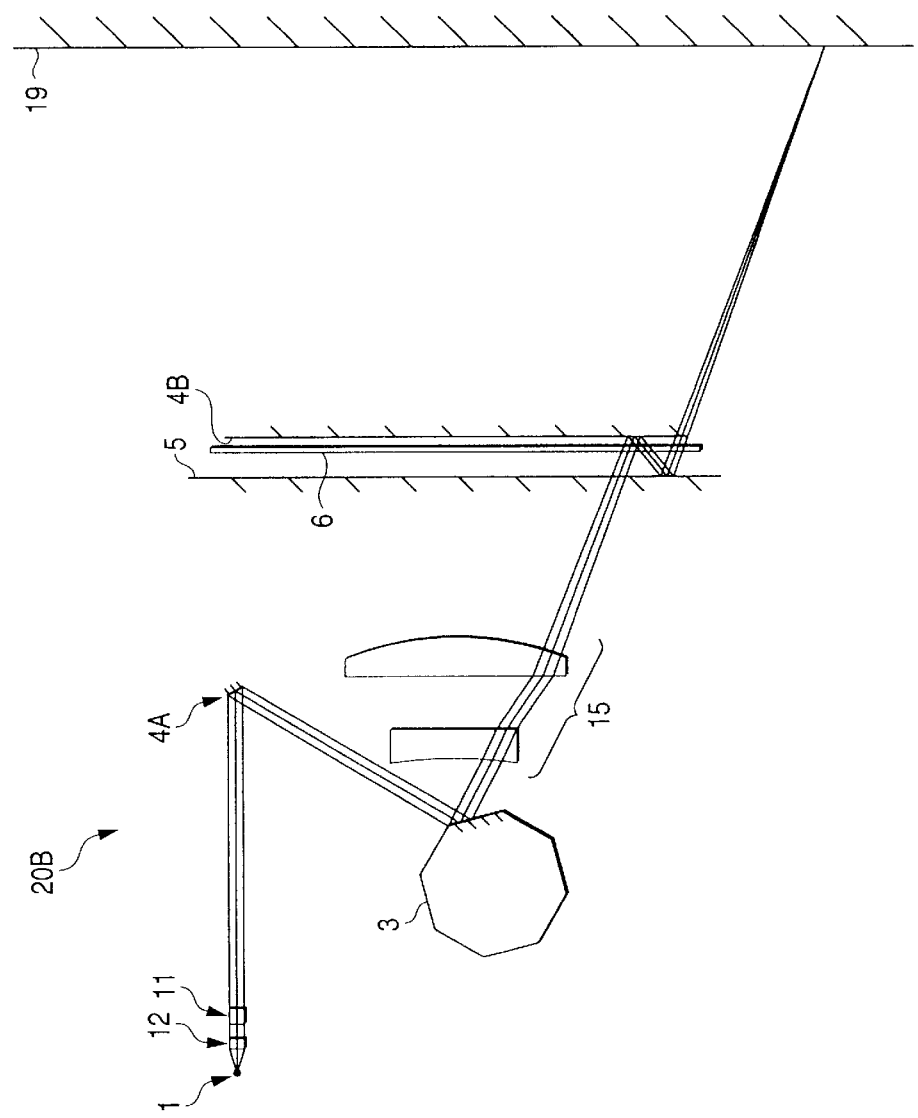
FIG. 2 is a schematic diagram to show the configuration of an optical scanning device according to a second embodiment of the present invention.

An optical scanning device 20B of the second embodiment shown in FIG. 2 has the same configuration as the optical scanning device 20A of the first embodiment (FIG. 1) in post-polygon optical system; in the optical scanning device 20B, to execute interlaced scanning, the distance between a cylindrical lens 11 and a rotating polygon mirror 3 in a pre-polygon optical system is lengthened and the curvature radius of the cylindrical lens 11 is enlarged, whereby image formation magnification βS is set large.

If it is not desired that the light path length of the pre-polygon optical system is made too long, a cylinder mirror 5 can be brought close to scan lenses 15 for making the image formation magnification βS large, thus the image formation magnification βS may be set large using such placement change of the cylinder mirror 5 in combination.

When the optical scanning device 20B comprising an underfilled optical system as shown in FIG. 2 executes interlaced scanning, the beam width required along the sub scanning direction in an interlaced scanning mode with a three-lines space becomes three times that in an adjacent scanning mode and the beam width required along the sub scanning direction in an interlaced scanning mode with a five-lines space becomes five times that in the adjacent scanning mode, as listed in the table of FIG. 12.

To execute interlaced scanning, wider light beams along the sub scanning direction than those in adjacent scanning are taken from light beams from a light source section and are scanned, so that higher output of scan beam can be intended.

Specifically, as listed in the table of FIG. 12, in the configuration of the underfilled optical system, while the energy efficiency in the adjacent scanning mode is 5.58%, that in the interlaced scanning mode with a three-lines space is 16.61%, namely, the latter becomes 2.98 times the former; that in the interlaced scanning mode with a five-lines space is 26.14%, namely, becomes 4.68 times the energy efficiency in the adjacent scanning mode.

Next, a third embodiment of the present invention will be discussed.

Figure 3:
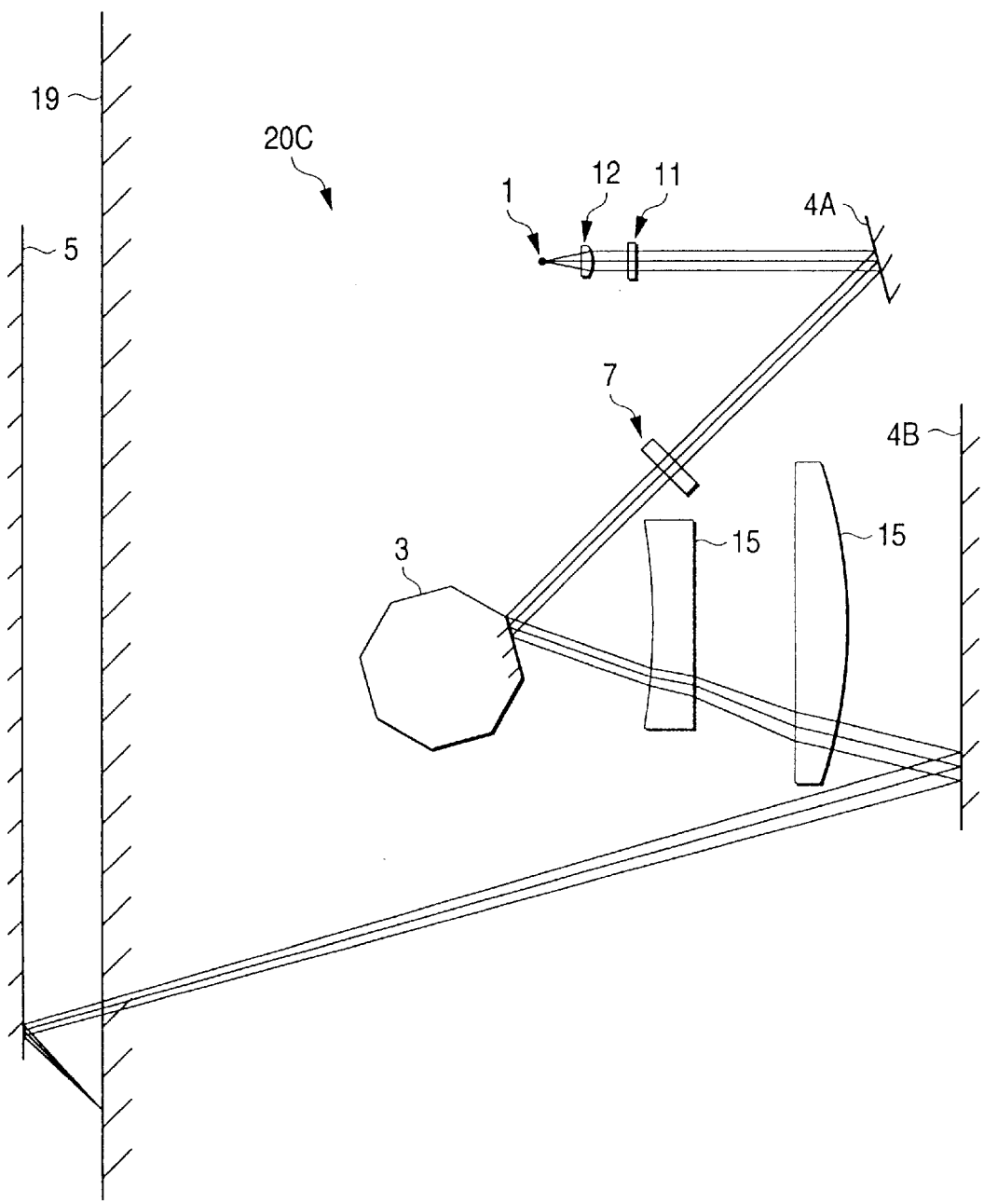
FIG. 3 is a schematic diagram to show the configuration of an optical scanning device according to a third embodiment of the present invention.

An optical scanning device 20C of the third embodiment shown in FIG. 3 comprises an underfilled optical system and a convex spherical lens 7 is placed between a mirror 4A and a rotating polygon mirror 3.

In the optical scanning device 20C, the spacing between a light source 1 and a collimator lens 12 is made shorter than the focal length of the collimator lens 12, whereby the beam emitted from the collimator lens 12 becomes divergent light beam, and the divergent light beam is made collimated light beam only in the main scanning direction through the convex spherical lens 7. That is, the beam width along the main scanning direction is reduced by means of the convex spherical lens 7.

At this time, the image formation magnification in the main scanning direction becomes the composite focal length of the collimator lens 12 and the convex spherical lens 7 in a pre-polygon optical system. Thus, the focal length becomes large and the image formation magnification βT becomes smaller as compared with a case where the convex spherical lens 7 is not placed.

Since the image formation magnification βT is made small without changing the focal length of the collimator lens 12, a loss of the light quantity does not occur and an defocus or dealignment phenomenon on a scanned face caused by temperature change, vibration, etc., can be lessened.

The composite focal length of the pre-polygon optical system may be enlarged and the image formation magnification βT may be made small by placing a lens for enlarging the beam width along the main scanning direction in the pre-polygon optical system in place of the lens for reducing the beam width along the main scanning direction such as the convex spherical lens 7.

FIG. 14 lists the specifications of an overfilled optical system in FIG. 4 described later. The specifications are almost the same as those of the underfilled optical system in FIG. 3 except that the distance between a cylindrical lens 11 and the rotating polygon mirror 3 is shorter than the numeric value in FIG. 14 because it is not necessary to widen the beam width in the sub scanning direction through the rotating polygon mirror 3 and except that the curvature radiuses of the cylindrical lens 11 and the convex spherical lens 7 differ from the numeric values in FIG. 14.

Next, a fourth embodiment of the present invention will be discussed.

Figure 4:
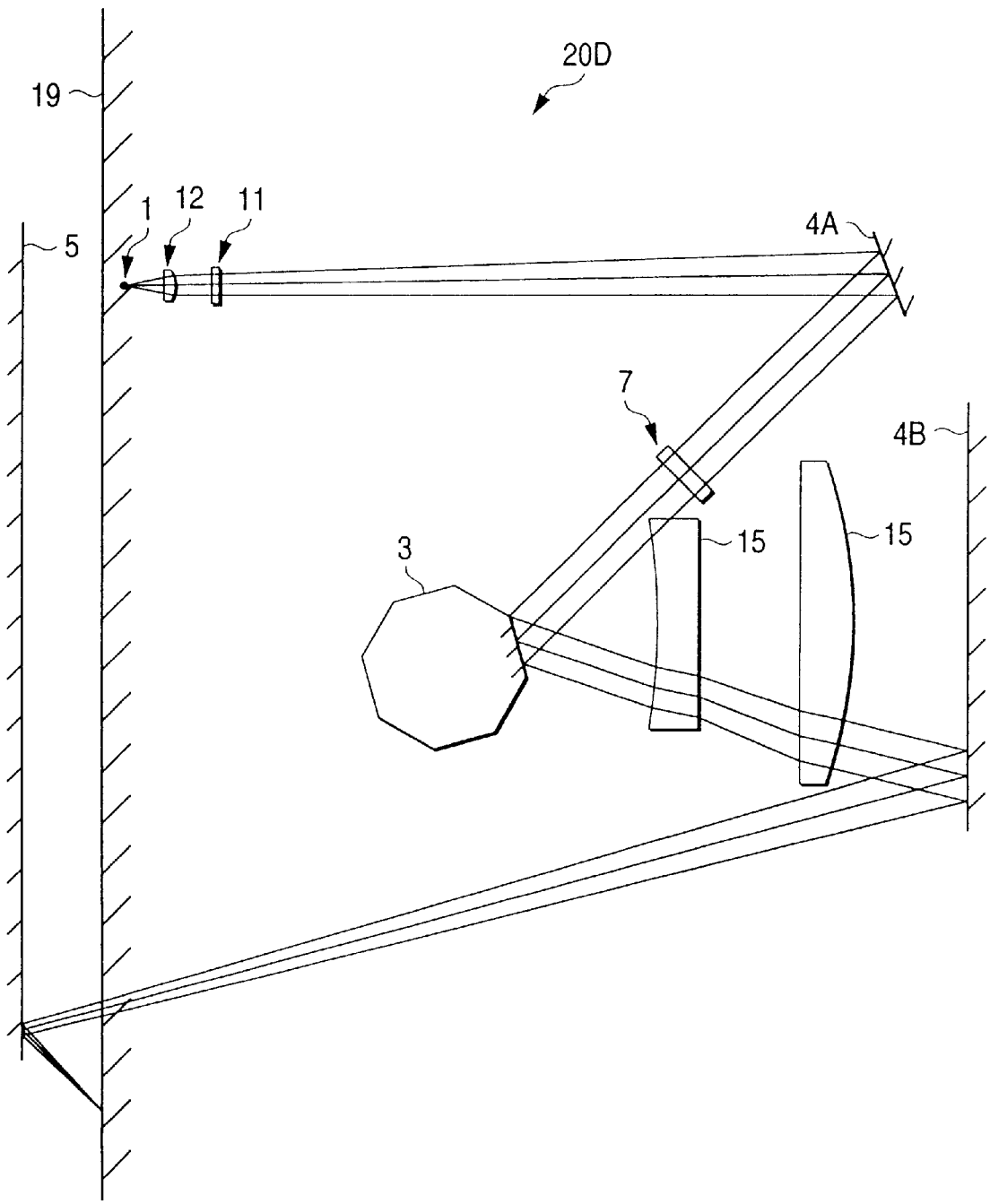
FIG. 4 is a schematic diagram to show the configuration of an optical scanning device of overfilled type according to a fourth embodiment of the present invention.

An optical scanning device 20D of the fourth embodiment shown in FIG. 4 comprises an overfilled optical system. That is, a reflection face of a rotating polygon mirror 3 is irradiated with a light beam wider than the width of the reflection face along the main scanning direction.

A convex spherical lens 7 is placed between a mirror 4A and the rotating polygon mirror 3, as in the optical scanning device shown in FIG. 3.

The overfilled optical system needs to be configured so as to provide a large beam width in the main scanning direction at the position of the rotating polygon mirror 3 (for example, about three times the width of the reflection face of the rotating polygon mirror 3). Thus, the spacing between a light source 1 and a collimator lens 12 is made shorter than the focal length of the collimator lens 12, whereby the beam emitted from the collimator lens 12 becomes divergent light beam, and the divergent light beam is made collimated light beam only in the main scanning direction through the convex spherical lens 7.

At this time, the image formation magnification in the main scanning direction becomes the composite focal length of the collimator lens 12 and the convex spherical lens 7 in a pre-polygon optical system. Thus, the focal length becomes large and image formation magnification βT becomes smaller as compared with a case where the convex spherical lens 7 is not placed.

Since the image formation magnification βT is made small without changing the focal length of the collimator lens 12, a loss of the light quantity does not occur and an defocus or dealignment phenomenon on a scanned face caused by temperature change, vibration, etc., can be lessened, as in the third embodiment.

The overfilled optical system has proper advantages that the rotating polygon mirror 3 can be downsized and that vibration of a drive mechanism of a motor, etc., occurring with the rotation operation of the deflector can be decreased.

The specifications of the optical system of the optical scanning device 20D of overfilled type shown in FIG. 4 are listed in the table of FIG. 14 in relation to the reference numerals in FIG. 4.

To adopt the overfilled optical system as an image formation optical system, it is desirable to place scan lens 15 so as to allow not only the light beam deflected by the rotating polygon mirror 3, but also the light beam incident on the rotating polygon mirror 3 to pass through. Such placement of the scan lens 15 is known as effective placement when the overfilled optical system is adopted. According to the placement, the incidence angle of the light beam incident on the rotating polygon mirror 3 can be made small and degradation of the light quantity distribution on a scanned face 19 along the scanning direction can be lessened.

Figure 5:
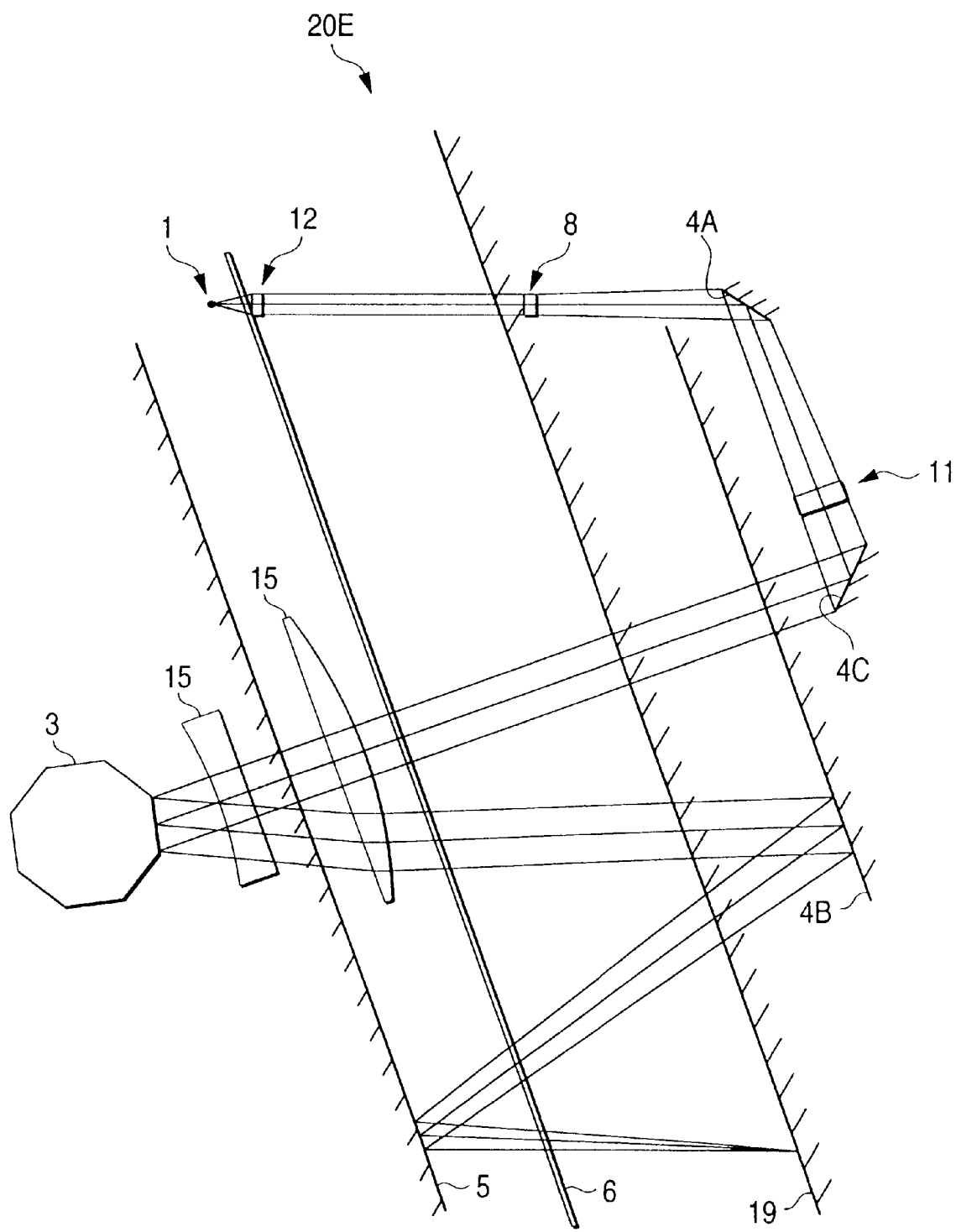
FIG. 5 is a schematic diagram to show the configuration of an optical scanning device of overfilled and double-pass scan lens type according to the fourth embodiment of the present invention for executing adjacent scanning.

By the way, in the configuration of the type in FIG. 5 (overfilled and scan lens double-pass type), the image formation magnification in the main scanning direction in the pre-polygon optical system becomes the composite focal length of the collimator lens 12, a concave spherical lens 8, and the scan lens 15 and thus becomes small as compared with the underfilled type in FIG. 1, FIG. 2, the overfilled type in FIG. 4. Thus, the image formation magnification βT in the main scanning direction between a light source 1 and scanned face 19 becomes the smallest (7.5 times) as shown in FIG. 11.

Since the image formation magnification βT is small in the type in FIG. 5, interlaced scanning with a three-lines space is executed, whereby image formation magnification βT (9 times) becomes larger than the image formation magnification βT.

The specifications of the optical system for the optical scanning device 20E of the type in FIG. 5 to execute adjacent scanning are listed in a table of FIG. 15 in relation to the reference numerals in FIG. 5.

Figure 6:
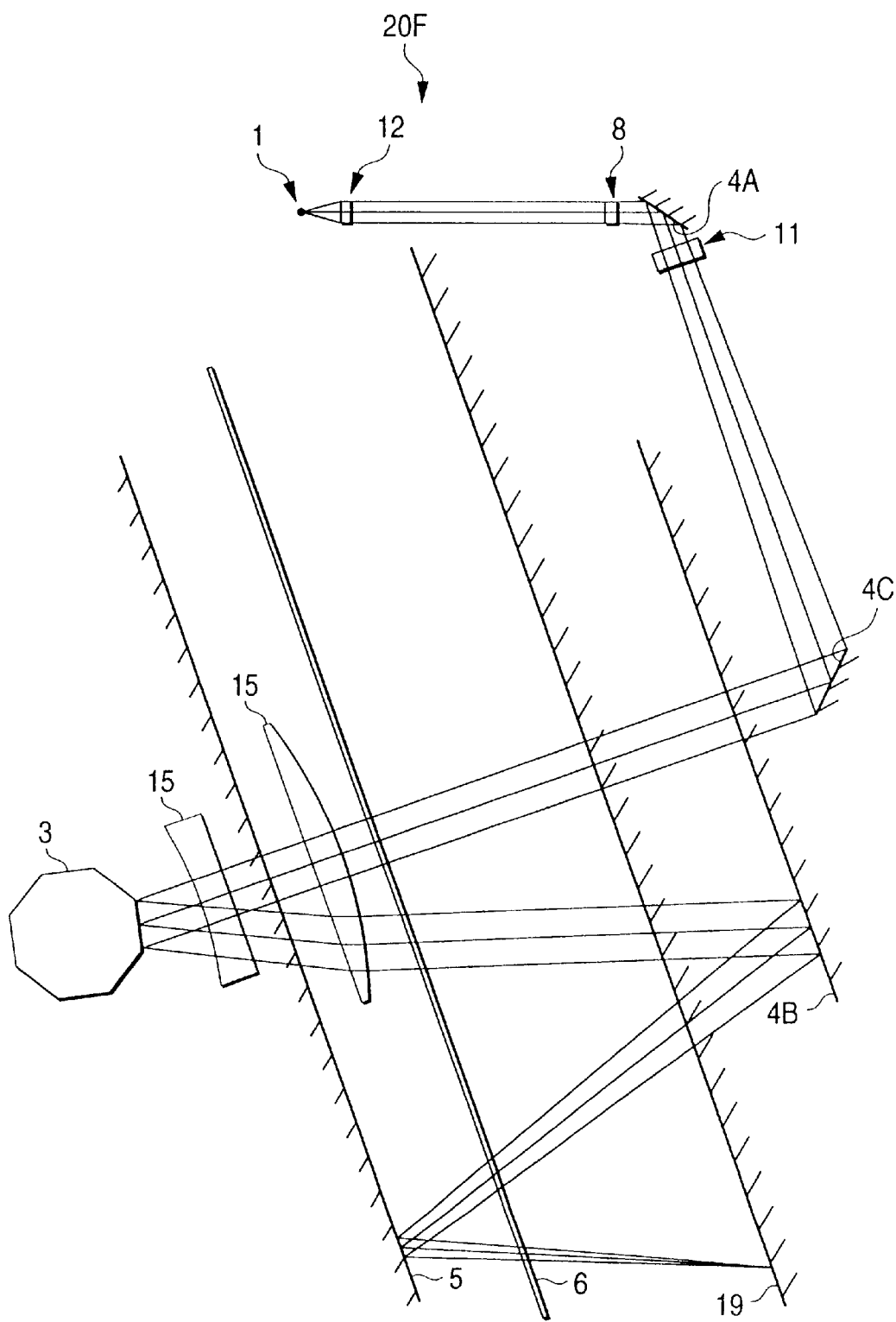
FIG. 6 is a schematic diagram to show the configuration of an optical scanning device of overfilled and double-pass scan lens type according to the fourth embodiment of the present invention for executing interlaced scanning.
Figure 8A:
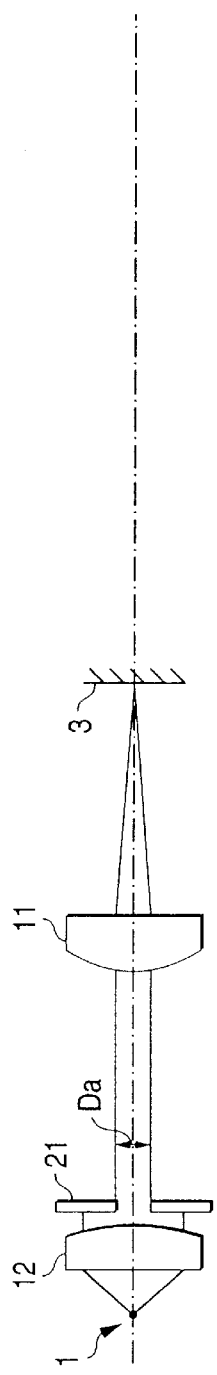
FIGS. 8A to 8D are illustrations to describe truncation in the fifth embodiment of the present invention.
Figure 8B:
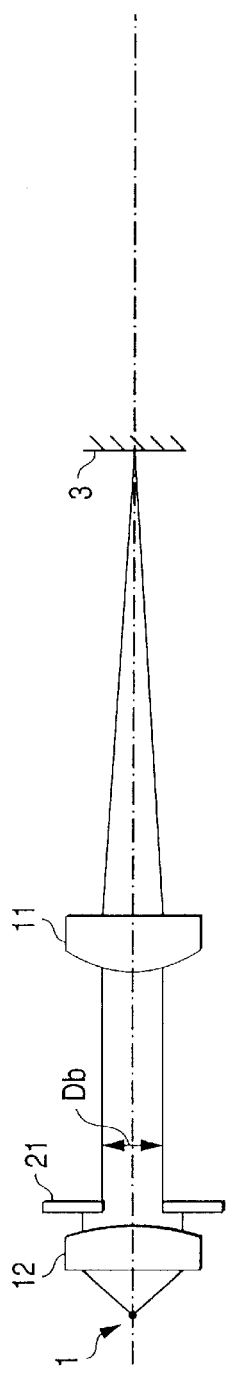
Figure 8C:
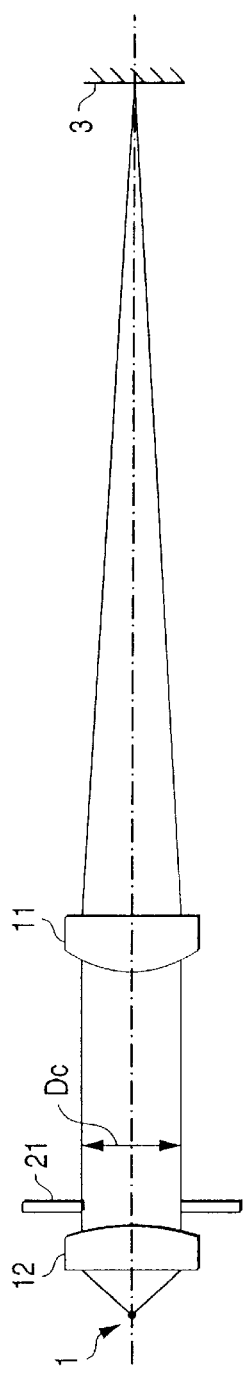
Figure 8D:
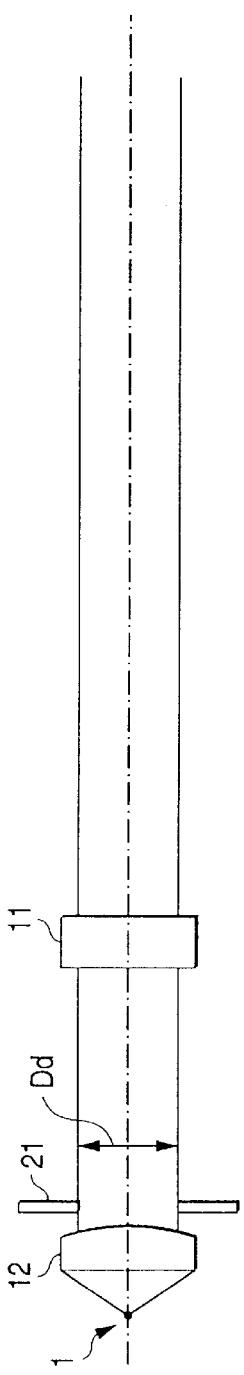
Figure 10:
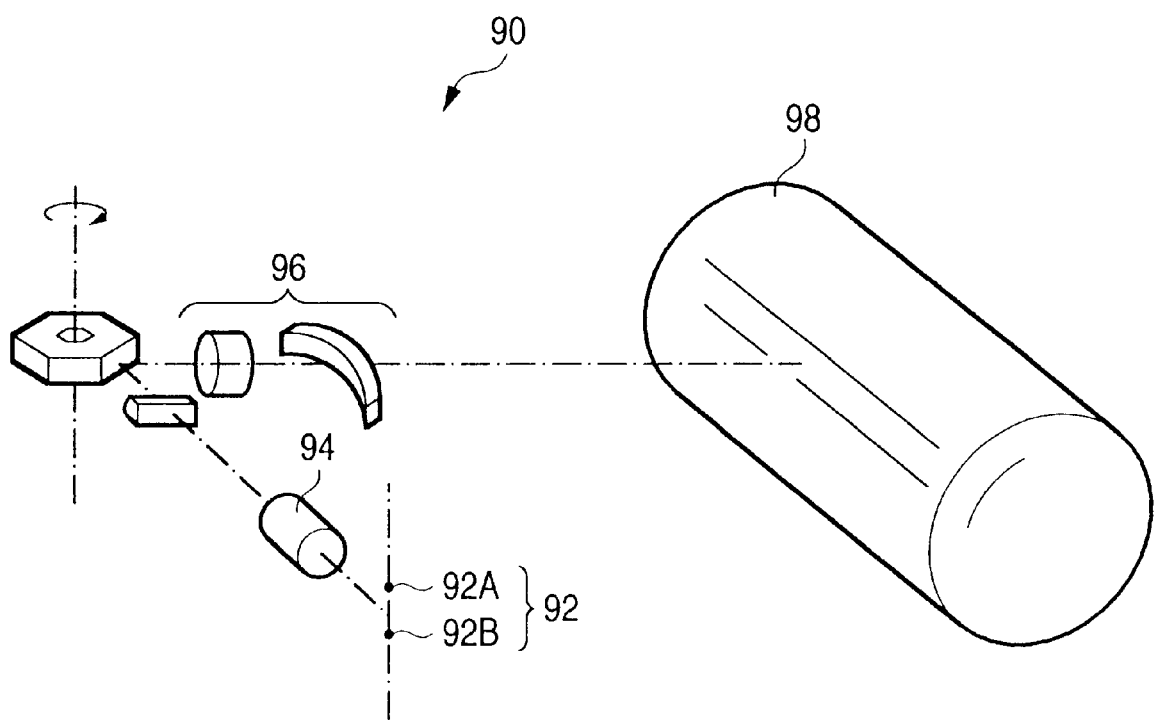
FIG. 10 is an illustration to describe a related art using MSLD.

FIG. 6 shows an optical scanning device 20F that can execute interlaced scanning with a three-lines space by changing pre-polygon optical system without changing the post-polygon optical system of the optical scanning device 20E in FIG. 5. As seen in FIG. 6, a cylindrical lens 11 moves to the side of a light source 1, thus the spacing between a concave spherical lens 8 and the cylindrical lens 11 on the light path is short.

In fact, the concave spherical lens 8, a mirror 4A, and the cylindrical lens 11 are too close to each other, thus the mirror 4A is placed after the cylindrical lens 11 or a collimator lens 12 with the light path length unchanged. However, the optical performance does not change regardless of which of the cylindrical lens 11 and the collimator lens 12 the mirror 4A is placed after.

The specifications of the optical system making it possible to execute interlaced scanning with a three-lines space in the overfilled and scan lens double pass type are listed in a table of FIG. 16 in relation to the reference numerals in FIG. 6.

Next, a fifth embodiment of the present invention will be discussed.

As seen in the table of FIG. 12, the beam width along the sub scanning direction just before incidence on a cylindrical lens grows in response to the number of interlaced lines in interlaced scanning.

As shown in FIG. 7A, in adjacent scanning, distance L between a cylindrical lens 11 and the reflection face of a rotating polygon mirror 3 is small and beam diameter R just before incidence on the cylindrical lens 11 is also small. Thus, the light beam spread angle of each light emitting source is constant and light beam is blocked by a slit 21 in a peripheral part for setting an appropriate beam width.

As shown in FIG. 7B and 7C, when interlaced scanning is executed, the distance L and the beam diameter R grow in response to the number of interlaced lines. The actual sizes are as listed in the table of FIG. 12.

As the number of interlaced lines is increased, the beam diameter R reaches effective diameter $D_d$ of a collimator lens 12.

Then, an optical scanning device of the embodiment is configured so that the beam width along the sub scanning direction, of light beam just after the beam is emitted from the collimator lens 12 becomes equal to or greater than the beam width along the main scanning direction.

Specifically, light emitting elements configured so that the spread angle of the emitted light along the sub scanning direction becomes equal to or greater than that along the main scanning direction are adopted as light emitting sources of a light source 1.

According to the configuration, the beam width along the sub scanning direction required for executing interlaced scanning can be provided and interlaced scanning can be executed smoothly.

If the light source 1 uses light emitting sources different in light beam spread angle depending on the light beam emitting direction and the light emitting sources are placed so that the light emitting sources with a small spread angle match in the sub scanning direction and those with a large spread angle match in the main scanning direction, a light beam having a beam diameter in the main scanning direction larger than the beam diameter in the sub scanning direction is emitted from each light emitting source. In such a case, the placement of the light emitting sources may be changed so that the emitted light spread angle along the sub scanning direction becomes equal to or greater than that along the main scanning direction as the whole light source 1.

When the beam width in the sub scanning direction needs to be enlarged, an expand function of making the light beam emitted from the collimator lens 12 divergent and making the divergent light beam collimated light beam through a convex spherical lens 7 following the collimator lens 12 can be used as previously described with reference to FIG. 4.

By the way, if interlaced scanning is executed as the beam diameter along the sub scanning direction on a scanned face 19 remains constant, the beam width just before incidence on the cylindrical lens 11 needs to be enlarged as previously described with reference to FIG. 7.

For example, if two beams are emitted from the light source 1, the minimum number of interlaced lines is three and the maximum number of interlaced lines is determined by the effective diameter of the collimator lens 12 and the width of the slit 21 along the sub scanning direction in an adjacent scanning mode. For example, if the beam diameter along the sub scanning direction on the scanned face 19 is 60 μm in the adjacent scanning mode, the slit width becomes 0.7 mm; if the beam diameter is 70 μm in the adjacent scanning mode, the slit width becomes 0.6 mm; if the beam diameter is 80 μm in the adjacent scanning mode, the slit width becomes 0.5 mm.

Since the beam diameter is possible to about 80 μm, 11-line (=5.5/0.5) interlace is possible in the case where focal length f, numerical aperture NA, and effective diameter of the collimator lens 12 are 12.5 mm, 0.22, and 5.5 mm respectively.

This is grasped as attenuation factor (truncation) relative to the entrance pupil of the collimator lens 12 and it is desired that the optical scanning device of the embodiment is configured so that the following expression (9) is true where the truncation in the sub scanning direction in the adjacent scanning mode is $T_1$, the truncation in the sub scanning direction in the interlaced scanning mode is $T_2$, and the maximum number of interlaced lines enabling interlaced scanning in the range of the effective diameter of the collimator lens 12 is 11:

$$2(1-T_1) \leq 1-T_2 \leq 11(1-T_1) \qquad (9)$$

That is, this expression (9) is an expression with N=11 in the expression (2) previously described.

The optical scanning device is configured so that the expression (9) is true, whereby interlaced scanning can be executed with any number of interlaced lines between the minimum number of interlaces lines and the maximum number of interlaced lines enabling interlaced scanning in the range of the effective diameter of the collimator lens 12 as the beam diameter along the sub scanning direction on the scanned face 19 remains constant in every number of beams, as previously described.

Next, a sixth embodiment of the present invention will be discussed.

To adopt an overfilled optical system, a configuration is required so as to provide a large beam width in the main scanning direction at the position of a rotating polygon mirror 3 (for example, about three times the width of the reflection face of the rotating polygon mirror 3 ), thus the light path length of a pre-polygon optical system becomes long. Normally, it is determined by an optical system having power in the main scanning direction.

However, to execute interlaced scanning, the focal length of a cylindrical lens 11 needs to be enlarged, thus it becomes necessary to set a long distance between the cylindrical lens 11 and the rotating polygon mirror 3.

Thus, the light path length of the pre-polygon optical system is determined by an optical system having power in the sub scanning direction such as the cylindrical lens 11 from the certain number of interlaced lines, and exceeds the light path length of the pre-polygon optical system required for accomplishing overfilled.

Then, in the embodiment, cylindrical lenses 11S comprising a convex lens and a concave lens in combination are placed between a collimator lens 12 and the rotating polygon mirror 3 as shown in FIG. 9A, whereby the light path length of the pre-polygon optical system can be shortened as seen in comparison with a cylindrical lens 11 as a single lens as shown in FIG. 9B; the scanner can be miniaturized.

In the embodiments described above, mainly the light source 1 is formed of a two-beam array, but the light source 1 may be formed of a three- or more-beam array and similar advantages can be provided.

The optical scanning devices previously described in the embodiments can be applied to image formation systems such as laser beam printers and can realize high-speed image formation processing for providing high-quality images because of stable, high-level optical scanning performance. They can also be applied to image readers, etc., for irradiating an original face with a light beam for reading an image.

As described above, according to the present invention, the image formation magnification βT is made small, whereby the spacing between the light source section and the optical system having power in the main scanning direction, placed between the light source section and the deflector widens, and the image formation magnification βS is made large, whereby wider light beams than was previously possible along the sub scanning direction, of the light beams emitted from the light source section are taken as scan beam. Thus, while high power output of scan beam is intended, an defocus or dealignment phenomenon on the scanned face can be lessened if the spacing between the light source section and the optical system having power in the main scanning direction, placed between the light source section and the deflector changes due to temperature change, vibration, etc. the optical scanning performance can be maintained at a high level.

What is claimed is:

1. An optical scanning device for scanning over a scanned surface in a main scanning direction with a plurality of light beams at the same time, the optical scanning device comprising:

a light source section having a plurality of separately drivable light emitting sources;

a deflector for deflecting the plural light beams emitted from the light emitting sources; and an image formation optical system for focusing the light beams on the scanned face, the image formation optical system having an image formation magnification along the main scanning direction which is one of equal to and less than an image formation magnification along a sub scanning direction perpendicular to the main scanning direction.

2. The optical scanning device as set forth in claim 1 wherein the scanning of the light beams is interlaced scanning.

3. The optical scanning device as set forth in claim 2 wherein the image formation optical system contains one of a lens for reducing a beam width along the main scanning direction and a lens for enlarging the beam width along the main scanning direction, said one lens being placed between the light source section and the deflector.

4. The optical scanning device as set forth in claim 3 wherein the image formation optical system is an overfilled optical system.

5. The optical scanning device as set forth in claim 4 wherein the image formation optical system contains a scan lens for moving the light beams deflected by the deflector on the scanned face at substantially constant speed, and the scan lenses are placed such that both of the optical beams incident on the deflector and the optical beams deflected by the deflector are allowed to pass therethrough.

6. The optical scanning device as set forth in claim 2 wherein the image formation optical system is an overfilled optical system.

7. The optical scanning device as set forth in claim 6 wherein the image formation optical system contains a scan lens for moving the light beams deflected by the deflector on the scanned face at substantially constant speed, and the scan lenses are placed such that both of the optical beams incident on the deflector and the optical beams deflected by the deflector are allowed to pass therethrough.

8. The optical scanning device as set forth in claim 2 wherein the image formation optical system contains a collimator lens being placed in the proximity of the light source section for making the light beams a substantially collimated light flux, and the beam width along the sub scanning direction, of the light beam just after the light beam is emitted from the collimator lens is one of equal to and greater than the beam width along the main scanning direction.

9. The optical scanning device as set forth in claim 2 wherein the image formation optical system contains a collimator lens being placed in the proximity of the light source section for making the light beams a substantially collimated light flux, and the following expression is true for truncation as attenuation factor relative to an entrance pupil of the collimator lens:

$$2(1-T_1) \leq 1-T_2 \leq N(1-T_1)$$

where truncation in the sub scanning direction in an adjacent scanning mode is $T_1$; truncation in the sub scanning direction in an interlaced scanning mode is $T_2$; and the maximum number of interlaced lines enabling interlaced scanning in the range of an effective diameter of the collimator lens is N.

10. The optical scanning device as set forth in claim 2 wherein the image formation optical system contains an optical system being placed between the light source section and the deflector for converging the light beams on a deflection face of the deflector along the sub scanning direction, and the optical system includes a cylindrical lens having at least one side shaped like a convexity and a cylindrical lens having at least one side shaped like a concavity.

11. The optical scanning device as set forth in claim 1 wherein the image formation optical system contains one of a lens for reducing a beam width along the main scanning direction and a lens for enlarging the beam width along the main scanning direction, and said one lens being placed between the light source section and the deflector.

12. The optical scanning device as set forth in claim 11 wherein the image formation optical system is an overfilled optical system.

13. The optical scanning device as set forth in claim 12 wherein the image formation optical system contains a scan lens for moving the light beams deflected by the deflector on the scanned face at substantially constant speed, and the scan lenses are placed such that both of the optical beams incident on the deflector and the optical beams deflected by the deflector are allowed to pass therethrough.

14. The optical scanning device as set forth in claim 1 wherein the image formation optical system is an overfilled optical system.

15. The optical scanning device as set forth in claim 14 wherein the image formation optical system contains a scan lens for moving the light beams deflected by the deflector on the scanned face at substantially constant speed, and the scan lenses are placed such that both of the optical beams incident on the deflector and the optical beams deflected by the deflector are allowed to pass therethrough.

* * * * *